United States Patent
Nakamichi et al.

(10) Patent No.: US 11,280,643 B2
(45) Date of Patent: Mar. 22, 2022

(54) MONITORING HUMIDITY MEASUREMENT SYSTEM AND MONITORING HUMIDITY MEASUREMENT METHOD

(71) Applicant: NEUBREX CO., LTD., Kobe (JP)

(72) Inventors: Masanori Nakamichi, Fukui (JP); Kazushige Nakao, Fukui (JP); Kinzo Kishida, Kobe (JP)

(73) Assignee: NEUBREX CO., LTD., Kobe (JP)

( * ) Notice: Subject to any disclaimer, the term of this patent is extended or adjusted under 35 U.S.C. 154(b) by 63 days.

(21) Appl. No.: 16/985,494

(22) Filed: Aug. 5, 2020

(65) Prior Publication Data

US 2021/0063209 A1 Mar. 4, 2021

(30) Foreign Application Priority Data

Sep. 2, 2019 (JP) .............................. JP2019-159253

(51) Int. Cl.
| | | |
|---|---|---|
| *G01D 5/353* | (2006.01) | |
| *G01K 11/32* | (2021.01) | |
| *G01K 11/322* | (2021.01) | |

(52) U.S. Cl.
CPC ..... *G01D 5/35358* (2013.01); *G01D 5/35303* (2013.01); *G01K 11/32* (2013.01); *G01K 11/322* (2021.01)

(58) Field of Classification Search
CPC ........... G01D 5/35358; G01D 5/35303; G01D 5/35361; G01D 5/35364; G01K 11/32; G01K 11/322

See application file for complete search history.

(56) References Cited

U.S. PATENT DOCUMENTS

| | | | |
|---|---|---|---|
| 2006/0165344 A1* | 7/2006 | Mendez .................. | E21B 47/09 385/13 |
| 2011/0228255 A1* | 9/2011 | Li .......................... | G01K 11/32 356/33 |
| 2012/0086443 A1* | 4/2012 | Bazzone ............... | G01J 1/0492 324/244.1 |

FOREIGN PATENT DOCUMENTS

| | | |
|---|---|---|
| JP | H0427853 A | 1/1992 |
| WO | 2010061718 A1 | 6/2010 |

OTHER PUBLICATIONS

Texier, et.al, "Advances in subsurface water-content measurement with a distributed Brillouin scattering fibre-optic sensor", Proceedings of SPIE, May 23, 2005, vol. 5855, pp. 555-558.

(Continued)

*Primary Examiner* — Jonathan M Hansen
(74) *Attorney, Agent, or Firm* — Buchanan Ingersoll & Rooney PC

(57) ABSTRACT

A monitoring humidity measurement system includes: a humidity measurement optical fiber including a first optical fiber and a humidity detection layer provided so as to annularly cover the first optical fiber; a reference optical fiber including a second optical fiber; a plurality of optical communication cables; and a signal processing device configured to, with a laser beam entering into the first and second optical fibers, calculate and obtain Brillouin frequency shift and Rayleigh frequency shift of backscatter light from the first and second optical fibers based on the entering laser beam, and store predetermined constants, wherein reference data and target data are measured from the Rayleigh frequency shift and an initial humidity value calculated from the Brillouin frequency shift, and the value of humidity at the present time is calculated on the basis of Rayleigh frequency shift per unit humidity calculated from a difference between the above two data.

8 Claims, 12 Drawing Sheets

(56) References Cited

OTHER PUBLICATIONS

Lenke, et.al, "Distributed humidity sensing based on Rayleigh scattering in polymer optical fibers", Proceedings of SPIE, 2010, vol. 7653, 76533X-1. (4 pages).

Liehr, et.al, "Distributed Humidity Sensing in PMMA Optical Fibers at 500 nm and 650 nm Wavelengths", Sensors, 2017, 17, 738. (12 pages).

Kawashima, et.al, "Effects of Irrigation Controllers used for Drip Irrigation Method on the Water Providing Pattern, Growth and Fruit Quality of Netted Melon", (2003), Res.Bull.Aichi Agric.Res.Ctr. 35:65-71. (7 pages).

\* cited by examiner

FIG. 2

TABLE 1

| SAMPLE PVA | SAPONIFICATION DEGREE (mol%) | VISCOSITY (mPa·s) | TEST CONCENTRATION (UNIT: %) | | | |
|---|---|---|---|---|---|---|
| | | | CONCENTRATION 1 | CONCENTRATION 2 | CONCENTRATION 3 | CONCENTRATION 4 |
| KH-20 | 78.5-81.5 | 44.0-52.0 | 10.0 | 5.0 | 2.5 | 10.0 (OLD) |
| NH-18 | 98.0-99.0 | 25.0-30.0 | 10.0 | 9.0 | 7.5 | 7.5 (OLD) |
| NL-05 | >98.5 | 4.6-6.0 | 15.0 | 10.0 | 7.5 | 10.0 (OLD) |

MONITORING HUMIDITY MEASUREMENT SYSTEM AND MONITORING HUMIDITY MEASUREMENT METHOD

BACKGROUND OF THE INVENTION

1. Field of the Invention

The present disclosure relates to a monitoring humidity measurement system and a monitoring humidity measurement method.

2. Description of the Background Art

Conventionally, environmental variables in soil of a farm field, an orchard, or the like, e.g., temperature, humidity, nitrogen concentration, phosphorus concentration, and potassium concentration, have been important indices in cultivation of crops. In addition, in a national guideline, promotion of precision agriculture is required, so that means for measuring data over a range of several tens of km in a distributed manner and in real time is needed. In consideration of needs in agriculture, the above technical means is required to have the following properties: a prolonged life of about ten years, a comparatively easy installation manner, a sufficient mechanical strength, flexibility for also adapting to farm machine work, ease of repair for damage, capability of coping with water immersion after embedding in soil, biting by an animal, or pest damage, flexibility to arrangement plan change, and the like.

Among conventional electric sensors, there is technology for measuring a humidity value, a pH value, and the like. However, there are a lot of problems, e.g., the distance from a measurement device to a sensor is short, a power supply is needed, and heat generation in an electric wire influences environmental variables. Therefore, it is difficult to perform large-scale installation on a farm.

Meanwhile, studies using a sensing function of an optical fiber have been reported. These mainly involve a point sensor using fiber Bragg grating (FBG) technology or Fabry-Perot (FP) technology, or a method of bonding an optical fiber using a hygroscopic material (polymethyl methacrylate (PMMA) or diatomaceous earth) as a reacting object. These methods are methods for one-point or multiple-point measurement, and therefore are unsuitable for recognizing a range of several tens of km in a distributed manner.

Further, an application with the title Distributed Humidity Detection Device has been published, in which a material used for humidity detection is a hygroscopic heat-generating material and therefore the influence of heat generation cannot be ignored (see, for example, Patent Document 1).

Further, other study examples using a sensing function of an optical fiber include a study in which an optical fiber is wound around a disk-like polymer and humidity measurement is conducted (see, for example, Non-Patent Document 1) and a study in which humidity measurement is conducted using a PMMA-based polymer optical fiber (POF) different in structure from a silica-based optical fiber (see, for example, Non-Patent Documents 2 and 3). However, in the former case, the polymer is a solid material. Therefore, four to ten hours are taken until a saturation state is reached. Thus, there is a problem that it is difficult to perform real-time measurement within a time of about thirty minutes and this method is unsuitable for distributed measurement. In the latter case, a long measurement time is required until reaching a saturation state, and there is an influence of humidity change over an entire region. Thus, there is a problem that it is difficult to make separation from the amount of temperature change which causes an influence at the same time.

As described above, a system that enables distributed measurement of environmental variables and allows comparatively easy installation and maintenance, on a land over a range of several tens of km, has not been realized.

Patent Document 1: Japanese Laid-Open Patent Publication No. 4-27853
Patent Document 2: WO2010/061718
Non-Patent Document 1: Sylvain Texier, et. al, "Advances in subsurface water-content measurement with a distributed Brillouin scattering fibre-optic sensor", Proceedings of SPIE Vol. 5855, 2005, pp. 555-558.
Non-Patent Document 2: Philipp Lenke, et. al, "Distributed humidity sensing based on Rayleigh scattering in polymer optical fibers", Proceedings of SPIE Vol. 7653, 76533X-1-76533X-4, 2010.
Non-Patent Document 3: Sascha Liehr, et. al, "Distributed Humidity Sensing in PMMA Optical Fibers at 500 nm and 650 nm Wavelengths", Sensors 2017, 17, 738, doi: 10.3390.
Non-Patent Document 4: Kazuko Kawashima, et. al, "Effects of Irrigation Controllers used for Drip Irrigation Method on the Water Providing Pattern, Growth, and Fruit Quality of Netted Melon", Aichi Agricultural Research Center Research bulletin 35: 65-71, 2003, pp. 65-71

Accordingly, in order to solve the above problems, in measurement of agricultural data (such as humidity, moisture in soil, and nutrient), technology for associating "temperature" and "strain" which can be measured by an optical fiber with agricultural data is required. In addition, in measurement by an optical fiber, frequency shifts due to "temperature" and "strain" occur at the same time, and therefore, data need to be separated in accordance with the intended purpose.

SUMMARY OF THE INVENTION

The present disclosure has been made to solve the above problems, and an object of the present disclosure is to provide a device and method that enable humidity measurement using an optical fiber and eliminate the influence of temperature change in the humidity measurement, and also shorten a time taken for frequency shift change in measurement using the optical fiber, thereby enabling distributed and real-time measurement of humidity on a land over a predetermined range.

A monitoring humidity measurement system according to the present disclosure includes: a humidity measurement optical fiber including a first optical fiber and a humidity detection layer provided so as to cover the first optical fiber; a reference optical fiber for measuring an environmental variable other than humidity, the reference optical fiber including a second optical fiber and arranged along with the humidity measurement optical fiber; and an optical signal processing device having a laser light source and a plurality of signal channels individually connected to the humidity measurement optical fiber and the reference optical fiber, the optical signal processing device being configured to calculate and obtain Brillouin frequency shift and Rayleigh frequency shift from backscatter light of a laser beam entering from the laser light source into each optical fiber, and store a proportionality constant representing a relationship between the Brillouin frequency shift and humidity, and a change coefficient which is a change amount of the Rayleigh frequency shift per unit humidity change amount.

Humidity at a predetermined position of the humidity measurement optical fiber is calculated from a sum of: an initial humidity value obtained by multiplying, by the proportionality constant, a difference between initial Brillouin frequency shifts respectively calculated with the laser beam entering from the laser light source into the humidity measurement optical fiber and the reference optical fiber; and a humidity change value obtained by multiplying, by a reciprocal of the change coefficient, a value obtained by subtracting a difference between the Rayleigh frequency shifts calculated with the laser beam emitted from the laser light source and entering into the humidity measurement optical fiber and the reference optical fiber at an initial time, from a difference between the Rayleigh frequency shifts calculated with the laser beam emitted from the laser light source and entering into the humidity measurement optical fiber and the reference optical fiber after a predetermined period has elapsed since the initial time.

The optical cable for distributed monitoring for environmental variables according to the present disclosure provides a significant effect of providing a device and a method that enable humidity measurement using an optical fiber and eliminate the influence of temperature change in the humidity measurement, and also shorten a time taken for frequency shift change in measurement using the optical fiber, thereby enabling distributed and real-time measurement of humidity on a land over a predetermined range.

BRIEF DESCRIPTION OF THE DRAWINGS

FIG. 2 is a table showing comparison of characteristics of sample PVA materials used for consideration of a humidity sensor optical fiber used in the first embodiment;

DETAILED DESCRIPTION OF THE PREFERRED EMBODIMENTS OF THE INVENTION

Hereinafter, an embodiment of the present disclosure will be described with reference to the drawings.

First Embodiment

[Conceptual Model]

First, an optical fiber used for a monitoring humidity measurement system according to the first embodiment will be described below, with reference to a conceptual model shown in FIG. 1. In order to measure agricultural data (humidity, nutrient, and the like), "temperature" or "strain" which can be measured by an optical fiber needs to be associated with the agricultural data. Normally, in measurement using an optical fiber, frequency shifts due to "temperature" and "strain" occur at the same time in an optical fiber, and therefore it is necessary to separate influences of these (see, for example, Patent Document 2). Meanwhile, it is shown that humidity which is one of agricultural data can be measured by an optical fiber as described in the above Background Art.

Accordingly, in the first embodiment, on the premise that humidity which is one of the agricultural data is to be measured in a distributed manner, the following is considered: a water-absorbing polymer material is used for a thin-film coating (having a thickness of approximately 5 to 7 μm) on an optical fiber, and using strain occurring in the optical fiber due to the influence of humidity, distribution of humidity is accurately measured by the optical fiber.

That is, whether it is possible to measure only a frequency shift in the optical fiber occurring due to humidity while eliminating the influence of a frequency shift due to temperature normally occurring in the optical fiber at the time of measurement as described above, is considered. The basic concept thereof will be described with reference to FIG. 1.

Figure 1:
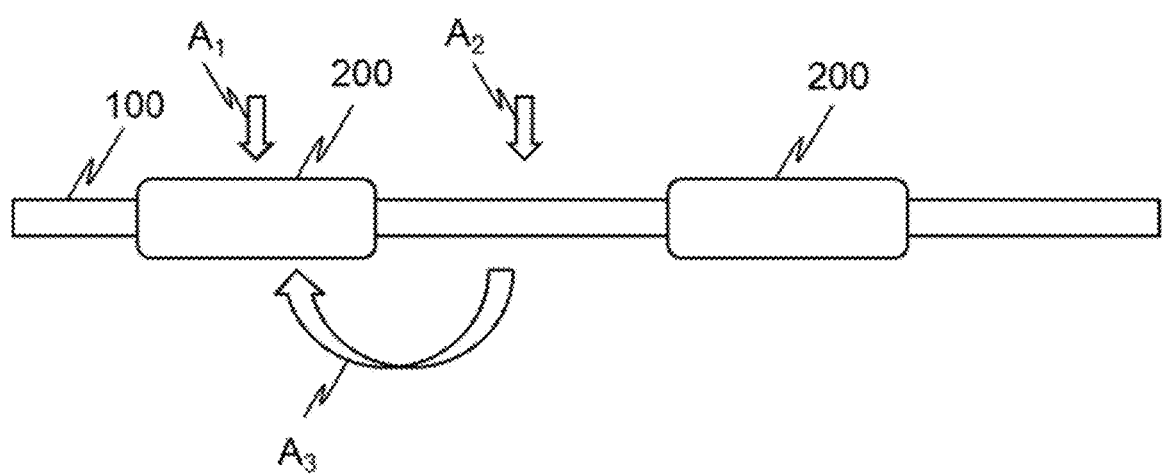
FIG. 1 is a conceptual model diagram showing the structure of an optical fiber used in the first embodiment of the present disclosure.

FIG. 1 is a conceptual model diagram showing the structure of the optical fiber used in the first embodiment. In FIG. 1, an optical fiber wire 100 is intermittently coated with a thin film of a water-absorbing polymer material 200. In the case of assuming that the optical fiber wire 100 coated with a thin film of the water-absorbing polymer material 200 as shown in FIG. 1 is installed under the environment subjected to the influence of humidity, for example, at a part indicated by arrow A1, the optical fiber wire 100 has thin-film coating of the water-absorbing polymer material 200, and therefore this part is influenced by both of humidity and temperature.

That is, the water-absorbing polymer material 200 expands by absorbing moisture and the optical fiber wire 100 is influenced by the expansion, and the optical fiber wire 100 is also influenced by temperature at the same time. Thus, frequency shifts due to both of these changes occur in the optical fiber wire 100. On the other hand, at a part indicated by arrow A2, the optical fiber wire 100 has no thin-film coating of the water-absorbing polymer material. Therefore, the optical fiber wire 100 is not influenced by humidity change but is influenced by only temperature change. Typical examples of the water-absorbing polymer material 200 include polyvinyl alcohol (hereinafter abbreviated as PVA).

Therefore, in order to consider only the influence of humidity change, it is required to subtract frequency shift data measured at the part indicated by arrow A2 from the frequency shift data measured at the part indicated by arrow A1 as shown by arrow A3. It is noted that the reason why the water-absorbing polymer material 200 is formed to be a thin-film coat with a thickness of 5 to 7 μm as described above is to enable measurement of frequency shift change within a short time.

To be exact, it is necessary to subtract a frequency shift occurring due to only temperature from a frequency shift occurring due to both of humidity and temperature at the same position in the axial direction of the optical fiber. However, it is assumed that temperature change in the axial direction is not sharp and therefore it is considered that error is small. This will be described later in detail, together with description about the drawings showing the structure of the optical fiber of the first embodiment.

[Humidity Measurement by Experiment]

First, an experiment for determining the water-absorbing polymer material suitable for humidity measurement was conducted. Hereinafter, the details of this experiment and a result thereof will be described with reference to the drawings. Here, PVA was used as the water-absorbing polymer material. The details thereof will be described below.

In material determination, considering hydrophilicity, capability of coating on the optical fiber, and capability of coating with a uniform film thickness, three types of PVA different in viscosity as shown in FIG. 2 were selected as sample PVA materials, and also the solution concentration thereof was changed as a parameter, thus obtaining twelve types of PVA materials in total, for which frequency shift change was measured. In this measurement, under the condition of constant temperature (20° C.), while humidity was changed stepwise from 7% (constant) to 70% (constant), Rayleigh frequency shift in the optical fiber with respect to an elapsed time (also referred to as reaction time of optical fiber), a saturation time taken until reaching maximum frequency shift, and the like were measured. Then, from a result of these measurements, a material appropriate for the humidity sensor was determined. At that time, whether or not characteristics change due to aging, i.e., characteristics deterioration occurred was also confirmed.

Here, KH, NH, and NL indicate manufacturer model numbers (the manufacturer of the selected PVA materials was Mitsubishi Chemical Corporation), and as shown in FIG. 2, the viscosity decreases in the order of KH-20, NH-18, then NL-5. In addition, regarding the solution concentrations (aqueous solution concentrations) of the PVA materials, as this value increases, the viscosity also increases.

It is noted that, in FIG. 2, a notation (OLD) following a numerical value in the column of solution concentration 4 indicates a condition for the numerical value shown in the table and means that the corresponding material is a coating material formed in the same manner about half a year before this experiment. The characteristics of the sample using this PVA material were measured to check whether or not aged deterioration occurred.

Next, a humidity measurement test was conducted using the optical fiber coated with a thin film of each sample PVA material. This test was conducted by measuring change in the value of frequency shift in the optical fiber when the humidity was changed stepwise from a certain constant humidity environment to a target humidity environment.

For setting of the humidity environment, a saturated salt method (method in which a material such as sodium chloride or lithium chloride is dissolved in water so as to be saturated and the solution is put in a sealed container, whereby a constant humidity environment is made depending on the conditions of the dissolved material and the space temperature) was used. A container for saturated salt method was placed in a constant-temperature constant-humidity device and a lid of the container for saturated salt method was opened to cause stepwise change in humidity environment, thus conducting the test. For temperature and humidity measurements in the measurement environment, a temperature and humidity meter of VAISALA (registered trademark) (model numbers were MI70 for the body and HMP77 for probe) which is a digital output type was used.

In order to make constant the moisture absorption amount in each sample PVA material at the start of the test, the optical fiber was kept for nine hours or longer under a stable humidity environment before the test, and after the condition was stabilized, the stabilized condition of the optical fiber in an environment with a humidity of about 7% was measured as reference data before start of the measurement test.

At the start of the measurement test, the optical fiber was placed in the constant-temperature constant-humidity device controlled at a constant temperature of 20° C. and a constant humidity of 70%, and then stepwise change in the humidity environment was caused. In the test involving the humidity environment change, measurement was performed for about five hours until moisture absorption of the sample PVA material of the coating was saturated so that frequency shift change was stopped, that is, frequency shift change was saturated. In the measurement, the intervals for acquiring data for measuring Rayleigh frequency shift in the sample were set such that the cycle per one measurement was about four minutes. The optical fiber for each sample was about 1 m in length and coated with the PVA material in a range of about 50 cm of the entire length.

Figure 3:
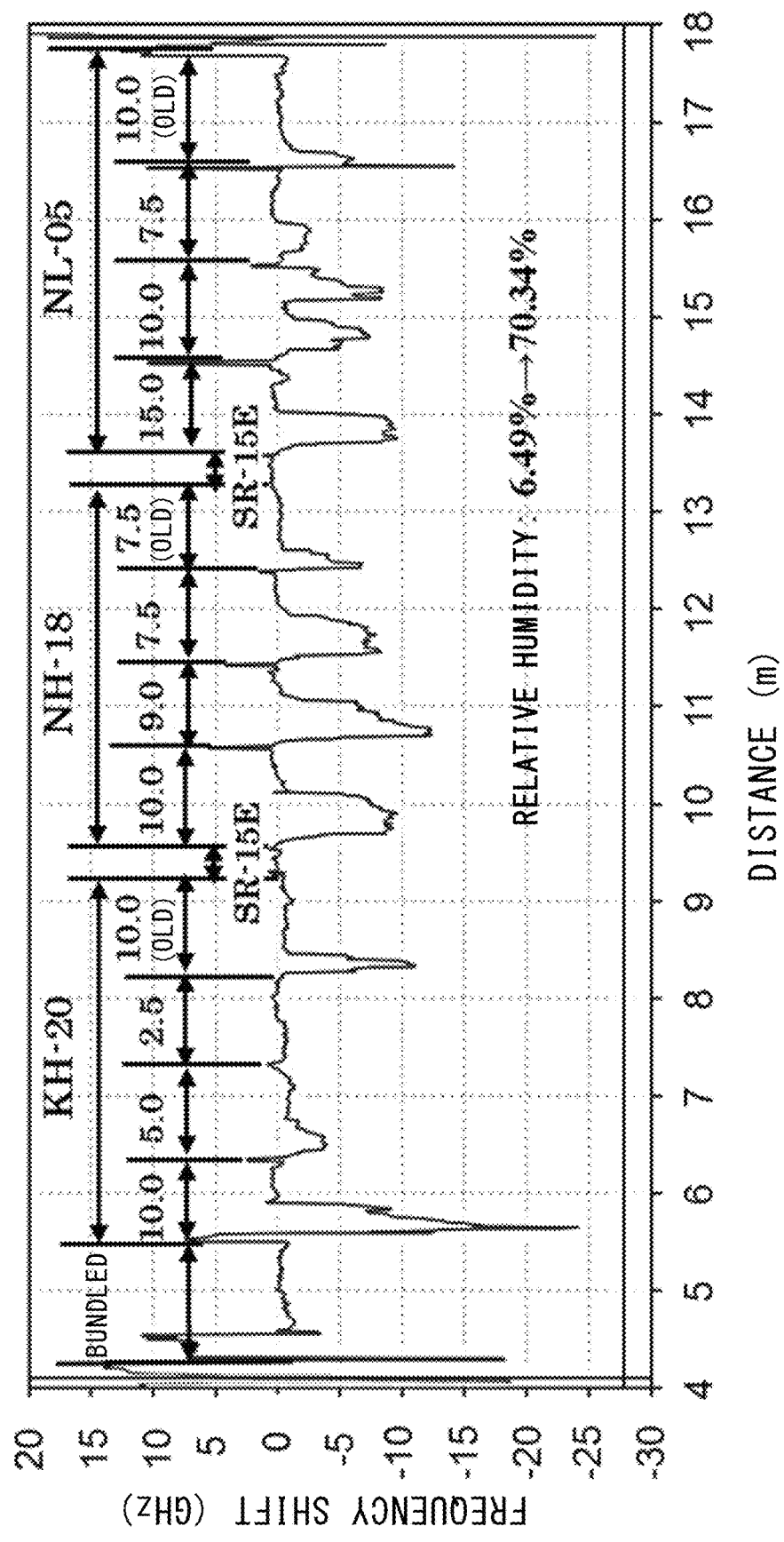
FIG. 3 is a graph showing a result of measurement of frequency shift of Rayleigh scattering light for the sample PVA materials.

Next, a result of measurement using the three types of samples shown in FIG. 2 will be described with reference to FIG. 3. FIG. 3 is a graph showing, by a curve, a measurement result in the case where coatings of the above three types of sample materials were formed at different positions on one optical fiber wire. In this graph, the horizontal axis indicates the distance from a predetermined reference position on the optical fiber in unit of meter, and the vertical axis indicates the amount of change, from a predetermined reference value, of Rayleigh frequency shift (hereinafter, simply referred to as frequency shift) due to humidity change in the sample materials. In this graph, a frequency shift in each sample material in the case where the relative humidity was changed stepwise from 6.49% to 70.34% is shown. As the predetermined reference value, the value at a "bundled part" was used. It is noted that the "bundled part" is the name referring to an optical fiber wire part for confirmation of temperature change, and data of the reference value actually used is shown at the left end part in FIG. 3. In FIG. 3, the left half of each double-headed-arrow interval with a numerical value corresponds to the range of about 50 cm in which the coating of the PVA material was formed. Hereinafter, a measurement result for each of the above three types of sample materials will be described in detail.

(1) Case of "KH-20"

In the sample of "10.0%", the maximum shift amount is as great as −16.44 [GHz]. However, there is a lot of coating application unevenness and the shape of the waveform is not regulated. In the sample of "5.0%", the maximum shift amount is as small as −3.92 [GHz]. Although the shape of the waveform is regulated, strain reaction occurs only in a range of about 20 cm in the coating length of 50 cm.

In the sample of "2.5%", the maximum shift amount is as extremely small as −0.84 [GHz]. In the sample of "10.0%

(OLD)", the maximum shift amount is −11.04 [GHz], which is small as compared to the same type of sample having the same solution concentration, created at this time. The error is as great as 5.4 [GHz], thus exhibiting significant deterioration.

(2) Case of "NH-18"

In the sample of "10.0%", the maximum shift amount is as great as −9.68 [GHz]. Also, the waveform is regulated. In the sample of "9.0%, the maximum shift amount is as great as −12.24 [GHz]. Even though the solution concentration [%] is lower than "10.0%", the shift amount is greater in this sample. The waveform partially has a stepped shape, and a certain extent of coating application unevenness appears. In the sample of "7.5%", the maximum shift amount is as great as −7.52 [GHz]. Also, the waveform is regulated. In the sample of "7.5% (OLD)", the maximum shift amount is −6.64 [GHz], which is small as compared to the same type of sample having the same concentration, created at this time. However, the error is as small as 0.88 [GHz], and thus the deterioration degree is considered to be very low.

(3) Case of "NL-05"

In the sample of "15.0%", the shift amount is as great as −9.56 [GHz], and the waveform is also regulated. In the sample of "10.0%", there are two shift depressions. It is estimated that this is because, when the optical fiber was coated with the polymer material, the polymer material was erroneously applied also to the part that should remain an optical fiber wire. The left part that was intentionally coated was adopted as data. The shift amount is as great as −7.44 [GHz]. In the sample of "7.5%", the shift amount is as small as −2.28 [GHz], but there is almost no coating application unevenness. In the sample of "10.0% (OLD)", the shift amount is −6.20 [GHz]. The error from the same type of sample having the same solution concentration is 1.24 [GHz], and thus the deterioration degree is considered to be low.

In the saturated salt method described above, frequency shift is calculated on the basis of the value of humidity, whereas, in the actual measurement, conversely, the value of humidity is calculated from measured frequency shift.

It is noted that evenness of coating film application was determined visually. As a result, the following four cases were favorable: "NH-18 7.5%", "NH-18 7.5% (OLD)", "NL-05 7.5%", and "NL-05 10.0% (OLD)".

Figure 4:
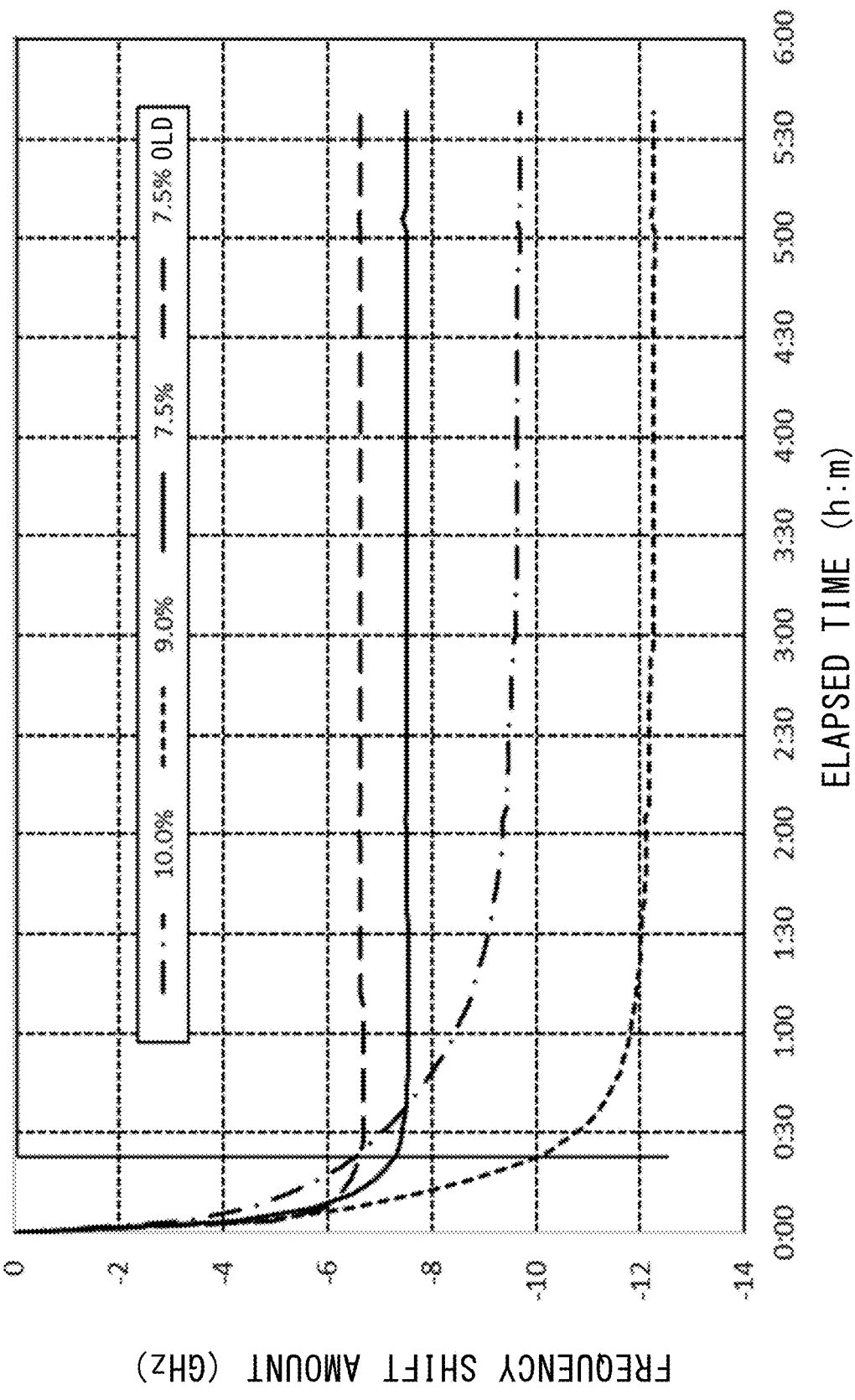
FIG. 4 is a graph illustrating reaction times of optical fibers coated with NH-18 materials among the sample PVA materials.

Next, using, as an example, the "NH-18" material which is determined to be most excellent in characteristics among the above described materials, a relationship with a reaction time (hereinafter, may be referred to as elapsed time) or a saturation time will be described (see FIG. 4). In the graph, the horizontal axis indicates the elapsed time in units of hour (h) and minute (m), and the vertical axis indicates Rayleigh frequency shift (hereinafter, may be simply referred to as frequency shift) in unit of GHz. The curves in the graph indicate frequency shifts with respect to the elapsed time in the optical fibers coated with the "NH-18" materials having four kinds of solution concentrations, and it can be also said that these indicate reaction times of the optical fibers coated with the NH-18" materials. As shown in the graph, the 10.0% sample having the highest solution concentration exhibits a long saturation time of 156 minutes, and thus the reaction is slow. The 9.0% sample having the second highest solution concentration also exhibits a long saturation time of 124 minutes. The 7.5% sample having the third highest solution concentration exhibits a short saturation time of 36 minutes, and thus the reaction is fast. The 7.5% (OLD) sample exhibits a saturation time of 24 minutes. From the results of the latter two types of 7.5%-solution-concentration samples, it is considered that the material deterioration degree is low.

Considering the above comprehensively, the PVA material considered to be optimum for the humidity sensor was determined. Here, factors regarded as important for use in the humidity sensor are the following four factors: "great frequency shift amount", "no coating application unevenness", "short saturation time", and "no deterioration". The material that meets these factors was preferentially determined. Consequently, it has been found that the "NH-18" material of "7.5%" is a material that satisfies all the conditions. This material is hereinafter referred to as suitable PVA material.

[Structures of Optical Fiber and Optical Cable]

Hereinafter, the structure of the optical fiber to be actually used, which is coated with the PVA material determined to satisfy the above requirements, will be described with reference to the drawings. For example, an optical fiber made of glass is coated with a thin film of the hygroscopic PVA material for humidity sensor described above, and the humidity is measured in a distributed manner on the basis of strain occurring in the glass optical fiber when the PVA material has absorbed moisture.

Figure 5:
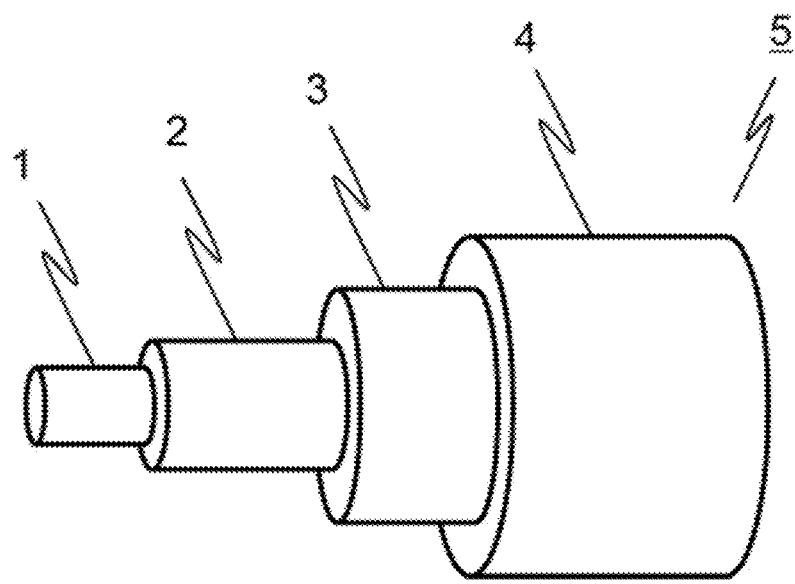
FIG. 5 is a model view illustrating a basic structure of a humidity measurement optical fiber according to the first embodiment.

FIG. 5 shows an example of a basic structure of a humidity measurement optical fiber 5 used for humidity measurement as described above. As shown in FIG. 5, the humidity measurement optical fiber 5 includes an optical fiber 1 provided at the center axis part, a coating layer 2 covering the optical fiber 1 to protect the optical fiber 1, a humidity detection layer 3 provided so as to cover the outer circumference of the coating layer 2, and a protection layer 4 covering the optical fiber 1, the coating layer 2, and the humidity detection layer 3 so as to protect these. The outer circumference diameter thereof (outer circumference diameter of the above humidity measurement optical fiber 5) is set to be smaller than 0.35 mm, for example.

Figure 6A:
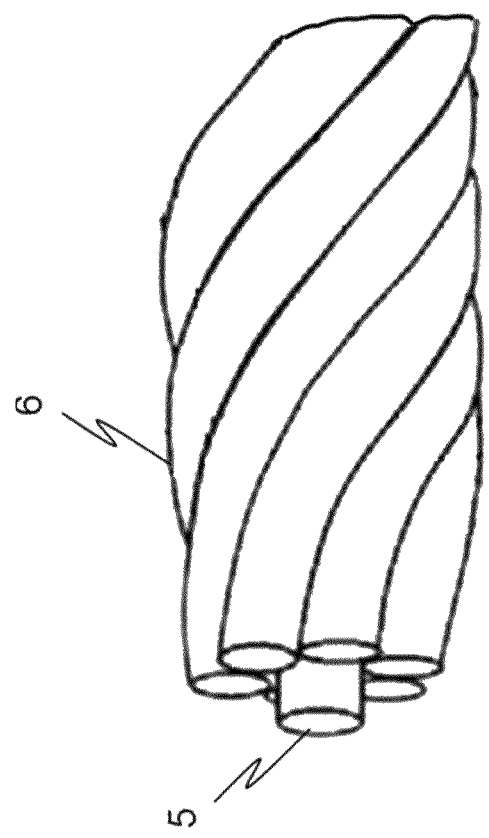
FIGS. 6A and 6B illustrate the structure of a humidity sensing portion of the humidity measurement optical cable according to the first embodiment.
Figure 6B:
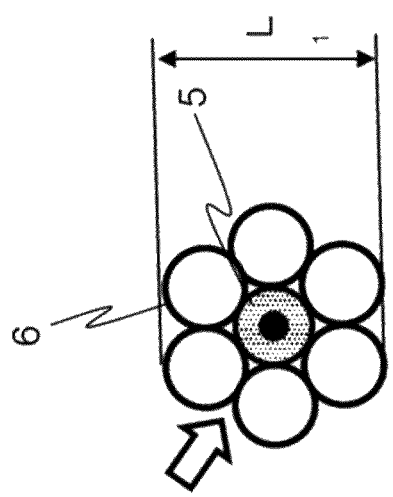

Next, the structure of a humidity measurement optical cable to be used in actual measurement, which includes the humidity measurement optical fiber 5, will be described with reference to the drawings. FIG. 6A and FIG. 6B are structure views showing the structure of a humidity sensing portion of the humidity measurement optical cable, which is the structure of a basic part when the humidity measurement optical fiber 5 is used in an actual site. FIG. 6A is a perspective view thereof, and FIG. 6B is a sectional view along a direction perpendicular to the axis of the optical cable. As shown in FIG. 6A and FIG. 6B, a strand protection layer 6 made of iron or stainless steel and having a strand structure is provided around the outer circumference of the humidity measurement optical fiber 5 so as to cover the humidity measurement optical fiber 5, thereby protecting the humidity measurement optical fiber 5.

In the sectional view shown in FIG. 6B, the outer diameter of each wire constituting the strand protection layer is 0.4 mm, and the size L1 of the outer circumference is, for example, 1.2 mm. This strand ensures bendability and strength of the entire humidity measurement optical fiber 5. An arrow at the upper left schematically indicates that water vapor or moisture enters the inside of the basic structure of the humidity measurement optical cable from an outer circumferential part. When humidity/moisture enters through the gap of the strand, the humidity detection layer can react.

Figure 7:
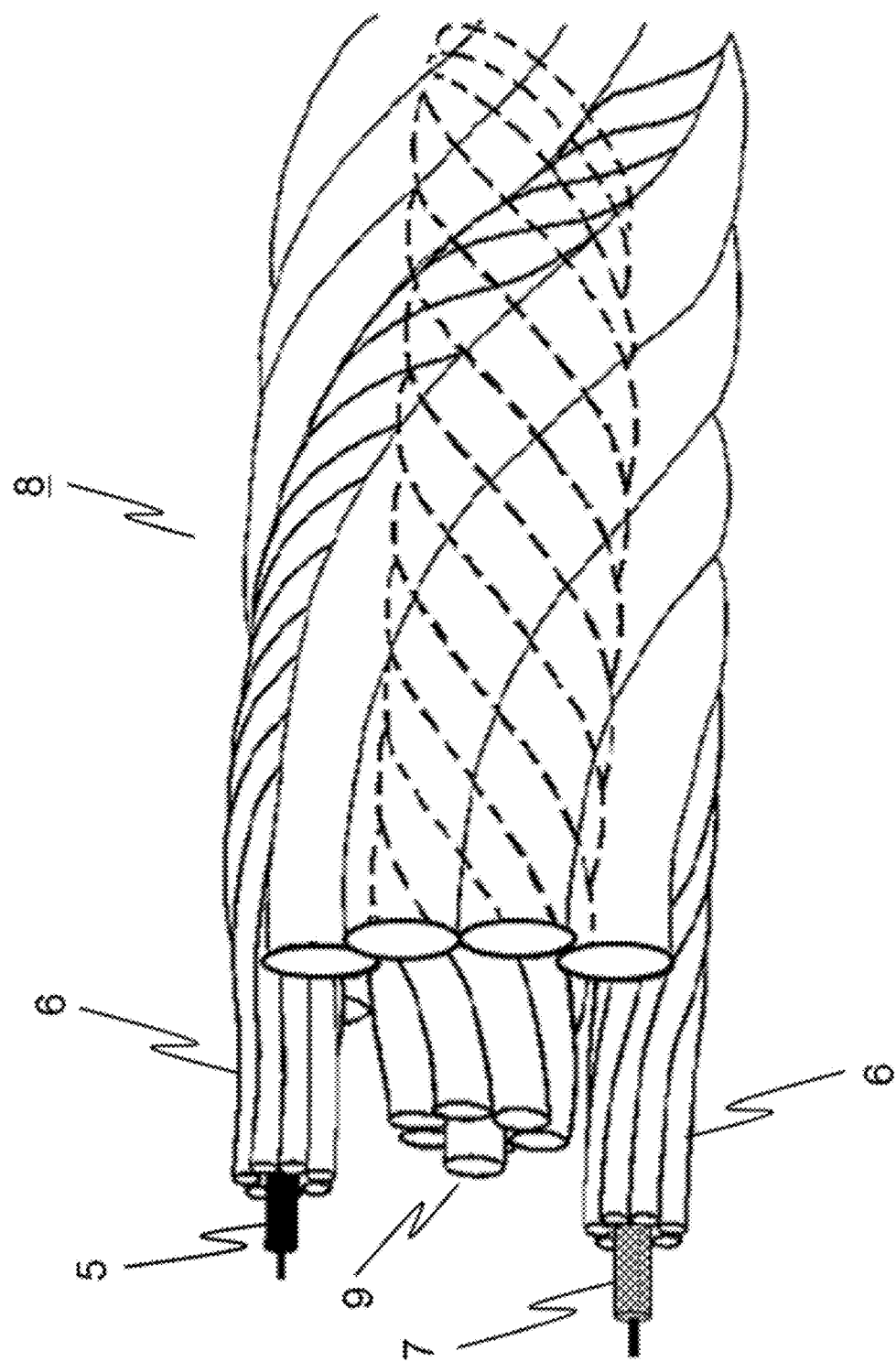
FIG. 7 is a perspective view showing the entire structure of a humidity measurement optical cable according to the first embodiment.

Next, the entire structure of a humidity measurement optical cable including the basic structure of the humidity measurement optical cable will be described with reference to the drawings. FIG. 7 is a perspective view showing the entire structure of a humidity measurement optical cable 8. The humidity measurement optical fiber 5 is provided so as to be helically wound around the outer circumference (upper side in FIG. 7) of the humidity measurement optical cable integrally with the strand protection layer 6, and as shown on the lower side, a reference optical fiber 7 (here, temperature measurement optical fiber) is provided in the same form integrally with another strand protection layer 6 protecting the reference optical fiber 7. In addition, at the center axis part of the humidity measurement optical cable, a central part structure 9 is provided which includes a plurality of solid wires having a strand structure or, as necessary, a plurality of helical tubes (pipes) inside which a communication cable or a power supply cable is provided, thus ensuring the strength of the entire cable. In addition, the humidity measurement optical cable 8 also has a function of energizing the power supply cable so as to evaporate moisture accumulated in the strand in a high-humidity condition.

Figure 8:
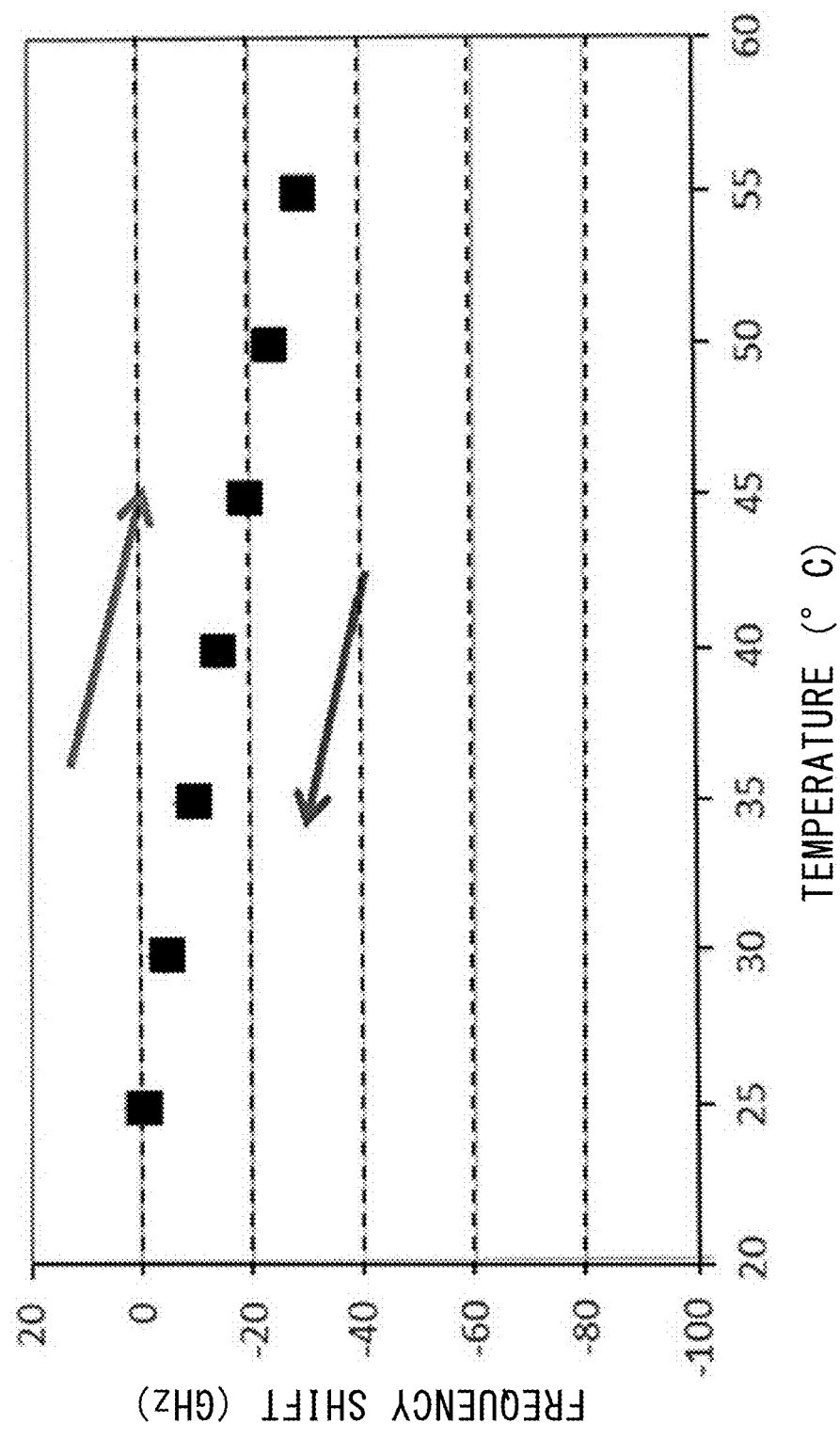
FIG. 8 is a graph showing frequency shift characteristics of a temperature measurement optical fiber for reference according to the first embodiment.

FIG. 8 shows characteristics based on actual measurement of the aforementioned temperature measurement optical fiber for reference. In FIG. 8, the horizontal axis indicates temperature (unit: ° C.), and the vertical axis indicates Rayleigh frequency shift (unit: GHz). As shown by arrows in FIG. 8, the values of Rayleigh frequency shifts do not differ in both of the case where the temperature changes from the low-temperature side to the high-temperature side and the case where the temperature changes from the high-temperature side to the low-temperature side, and thus it is found that the characteristics do not exhibit so-called hysteresis.

[Real-Time Humidity Measurement]

Figure 9:
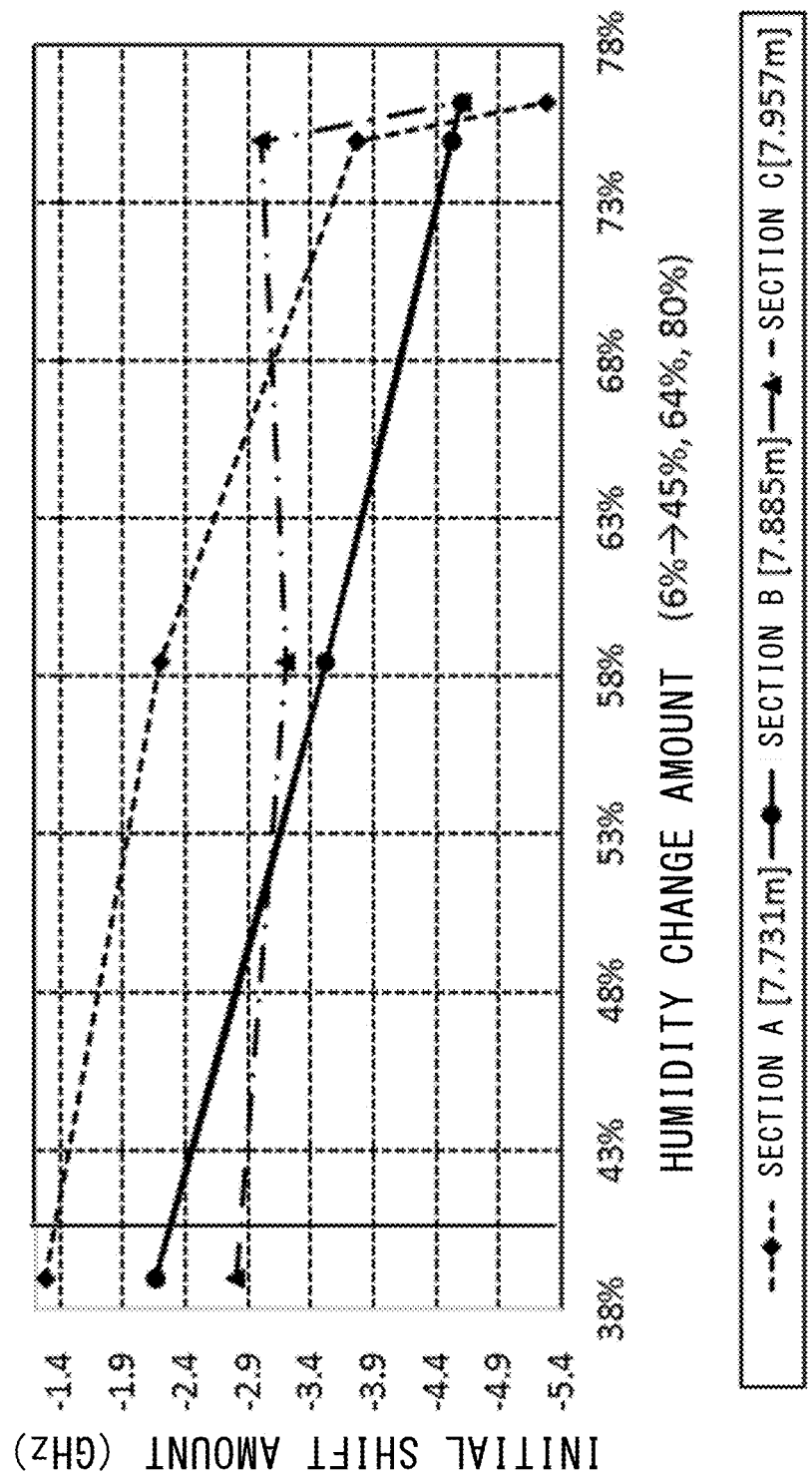
FIG. 9 is a graph showing actual measured values of initial frequency shift change amounts with respect to the humidity change amount in the case where an optical fiber is coated with a thin film of the NH-18 PVA material having a solution concentration of 7.5%.

With the method of determining the value of humidity through saturation of frequency shift as described above, it is difficult to measure, in real time, the humidity value that varies every second. Accordingly, hereinafter, a real-time humidity measurement method using an initial shift change amount (for example, data within three minutes after humidity change) will be described with reference to the drawing. FIG. 9 is a graph showing, with comparison among sections, actual measured values of the change amounts of frequency shifts with respect to humidity change during an initial period, i.e., one minute from the start of measurement, in the case where the optical fiber was coated with a thin film of the NH-18 PVA material with a condition that the solution concentration was 7.5%. As shown in the graph, it is found that, in section B, there is a linear relationship between humidity change and frequency shift change, irrespective of the value of humidity. In section B, it is considered that coating with the PVA material was made appropriately as compared to section A and section C. In other words, it is indicated that the manner of coating on the optical fiber wire is important for obtaining an appropriate value.

Step S1: Measurement of Initial Humidity Value $RH_0$ (Brillouin Measurement)

In measurement of initial humidity, not a Rayleigh measurement method but a Brillouin measurement method is used. This is because the absolute amount of humidity can be measured by the Brillouin measurement method (on the other hand, the Rayleigh measurement method which enables more accurate measurement (distance resolution is 2 cm) is used for measurement of the change amount of humidity).

Accordingly, in order to calculate an initial humidity, first, by Brillouin measurement, a Brillouin frequency shift $v(0, B_{S, T})$ (hereinafter, abbreviated as humidity measured part data $v(0, B_{S, T})$) at a humidity measured part at time t=0 (zero), and a Brillouin frequency shift (hereinafter, abbreviated as temperature measured part data $v(0, B_T)$) at a temperature measured part at time t=0 (zero), are measured.

As described at the beginning with reference to FIG. 1, the humidity measured part data include frequency shifts occurring due to "temperature" and "strain" (which is caused in the optical fiber due to expansion of the water-absorbing polymer material absorbing moisture). Therefore, the frequency shift amount based on only "strain" at the humidity measured part is calculated by Expression (1). As with the above number 0, the first numbers 0 in parentheses in Expression (1) all indicate that the value is at initial time t=0 (zero).

$$v(0,B_S)=v(0,B_{S,T})-v(0,B_T) \quad (1)$$

Finally, using a proportionality constant $K_A$ established between "humidity" and "strain" in Brillouin measurement, an initial humidity value $RH_0$ is calculated by Expression (2).

$$RH_0=K_A*v(0,B_S) \quad (2)$$

The calculations in the above expressions are performed using the saturated value of frequency shift. Therefore, measurement needs to be performed under an environment in which there is less change in humidity over a long period. Even by this measurement alone, the humidity value after elapse of time can be calculated, but since it is necessary to wait for saturation of humidity, it is difficult to perform real-time measurement. From FIG. 4 shown above, it is found that, in the case of using a PVA coating material having a low solution concentration, the value of humidity is saturated in about 30 minutes, and thus saturation is reached within a comparatively short time. However, as previously described, if such a length of saturation time is supposed, it is difficult to make actual application to real-time measurement in an agricultural environment. For example, in fertigation which is considered in greenhouse melon cultivation, a pF sensor used for measuring a soil pF value is a type capable of measurement in several seconds (see Non-Patent Document 4). Accordingly, a humidity measurement method using Rayleigh measurement shown below is further combined.

Step S2: Measurement of Reference Data $v(0, R_{S, T})$, $v(0, R_T)$ (Rayleigh Measurement)

As in step S1, a Rayleigh frequency shift $v(0, R_{S, T})$ at a humidity measured part for reference at time t=0 (zero) (hereinafter, referred to as humidity measured part data $v(0, R_{S, T})$; the same applies in the case of time t instead of time 0), and a Rayleigh frequency shift $v(0, R_T)$ at a temperature measured part at time t=0 (zero) (hereinafter, referred to as temperature measured part data $v(0, R_T)$; the same applies in the case of time t instead of time 0), are measured, and then the frequency shift amount based on only "strain" at the humidity measured part for reference is calculated by the following Expression (3).

$$v(0,R_S)=v(0,R_{S,T})-v(0,R_T) \quad (3)$$

Step S3: Measurement of Target Data $v(t, R_{S, T})$, $v(t, R_T)$ (Rayleigh Measurement)

Next, humidity measured part data $v(t, R_{S, T})$ and temperature measured part data $v(t, R_T)$ for a target (time at which the humidity value is desired to be calculated) are measured, and the frequency shift amount based on only "strain" at the humidity measured part is calculated by Expression (4).

$$v(t,R_S)=v(t,R_{S,T})-v(t,R_T) \quad (4)$$

Step S4: Calculation of Frequency Shift Change Amount in Rayleigh Measurement

Using the reference data $v(0, R_S)$ and the target data $v(t, R_S)$ represented by Expression (3) and Expression (4), the frequency shift change amount in Rayleigh measurement is calculated by the following Expression (5).

$$\Delta v(t,R_S) = v(t,R_S) - v(0,R_S) \quad (5)$$

Step S5: Calculation of Present Humidity Value $RH_t$

In the above humidity measurement experiment, a linear relationship has been seen between the humidity change amount and the initial shift amount in Rayleigh measurement (measurement time: about 90 seconds) (see FIG. 9). In addition, it has been found that a great shift change amount can be measured even in such a short time. From these data, a change coefficient $K_B$ which is the change amount of frequency shift when the humidity changes by 1% can be calculated by the following Expression (6).

$$K_B = \Delta v(t,R_S)/\Delta RH_t = \Delta v/\Delta RH \approx -5.9 \times 10^{-2} \quad (6)$$

Using the change coefficient $K_B$, $RH_0$ calculated in step S1, and $\Delta v(t, R_S)$ calculated in step S4, a value $RH_t$ of humidity at the present time can be calculated by the following Expression (7).

$$RH_t = \Delta v(t,R_S)/K_B + RH_0 \quad (7)$$

Here, $\Delta v(t, R_S)/K_B$ is equal to the humidity change amount from the initial time to the present time (see the following Expression (8)).

$$\Delta v(t,R_S)/K_B = \Delta RH_t \quad (8)$$

Figure 10:
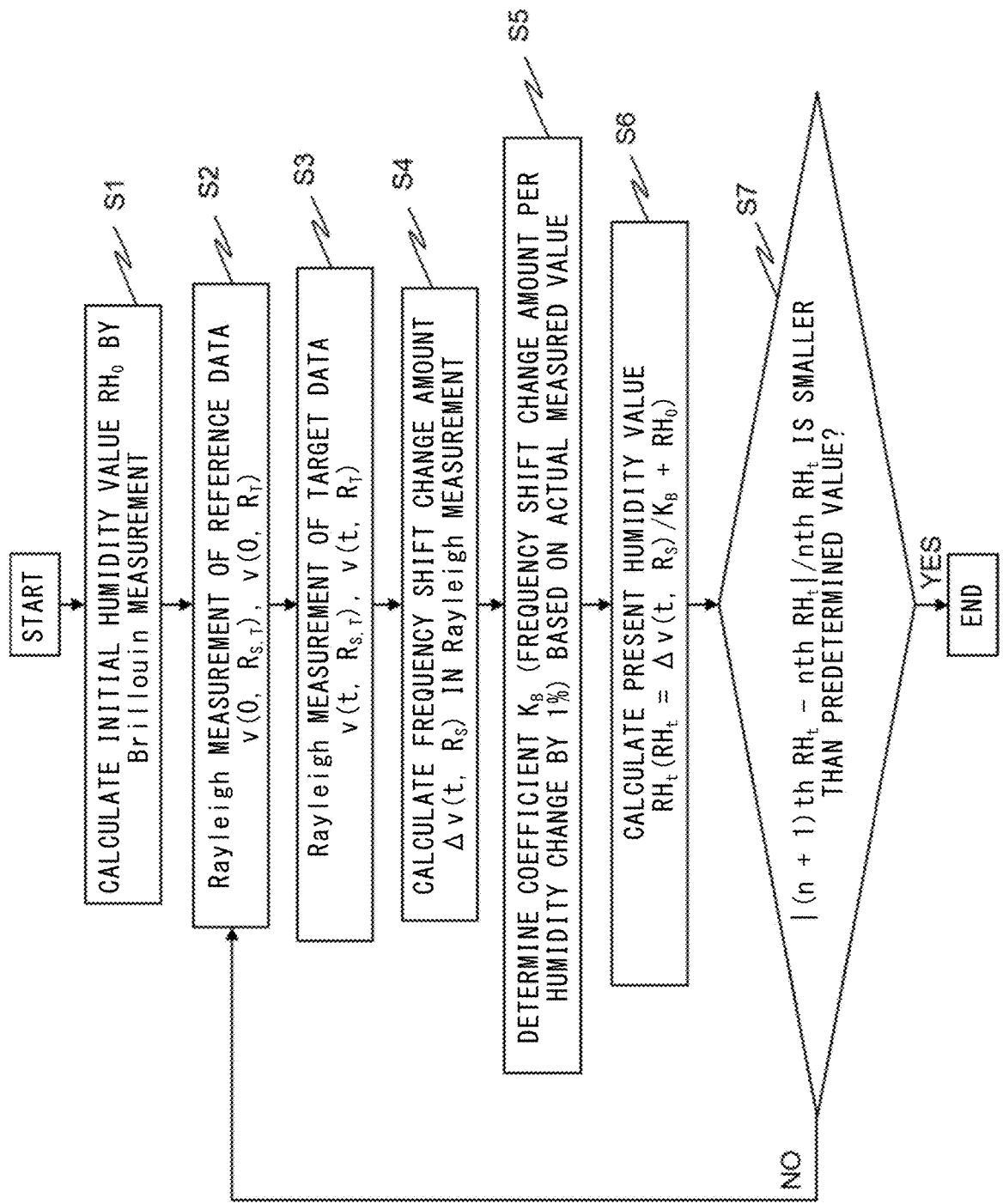
FIG. 10 is a flowchart for performing real-time measurement using a humidity measurement optical cable according to the first embodiment.

Subsequently, the process from step S2 to step S5 is repeated, whereby the value of humidity can be measured in real time (FIG. 10). Here, at repetition for the (n+1)th time, the nth data is used as reference data. Then, when the difference between the repeatedly calculated values (a value obtained by dividing the absolute value of the difference between the (n+1)th value and the nth value by the nth value) becomes smaller than a predetermined value (e.g., smaller than 0.001), the value at this time is used as the required humidity value obtained by the real-time measurement method.

Figure 11:
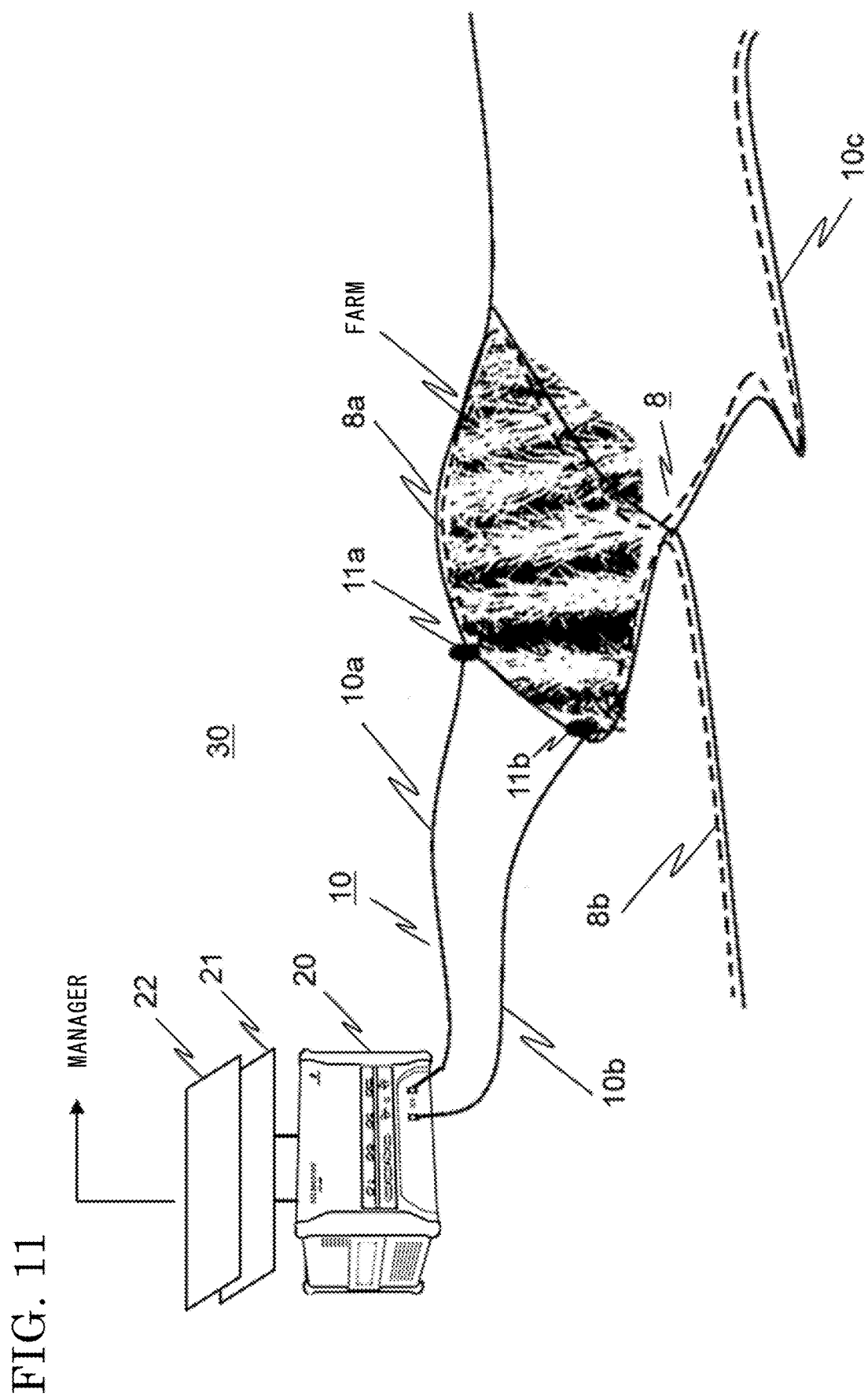
FIG. 11 shows an example of a monitoring humidity measurement system according to the first embodiment.
Figure 12:
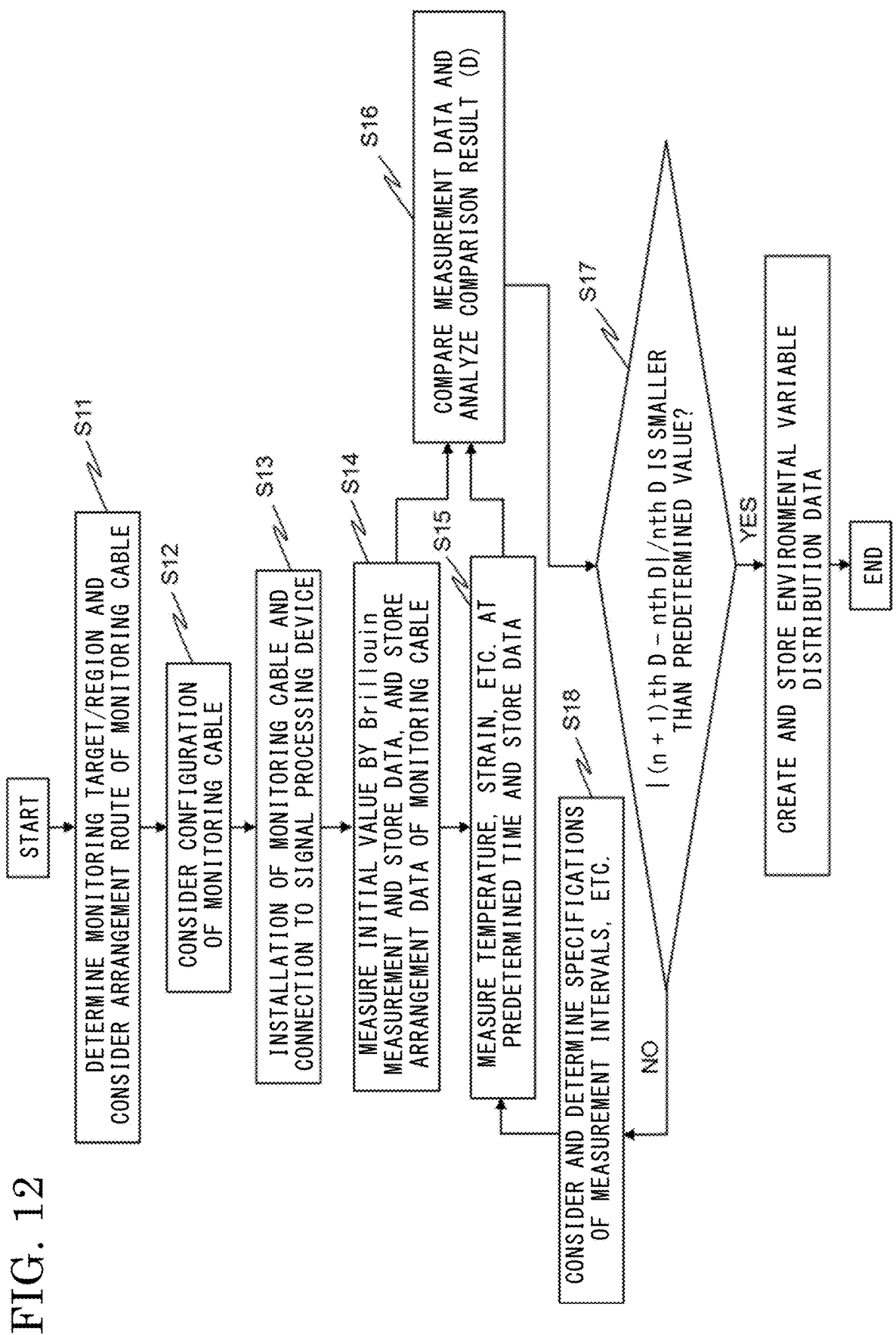
FIG. 12 is a flowchart for measuring humidity on a site, using the measurement system shown in FIG. 11.

Next, on the basis of the above result, a measurement system capable of measuring humidity in real time will be described with reference to FIG. 11 and FIG. 12. FIG. 11 shows an example of a measurement system capable of measuring humidity which is one of environmental variables used in a farm field, an orchard, or the like, proposed here. FIG. 12 is a flowchart for measuring humidity using the measurement system on the site.

Regarding the measurement system, first, the case where the environmental variable is humidity will be described with reference to FIG. 11. In FIG. 11, the humidity measurement optical cable 8 (indicated by broken-line curve in the drawing) which is a monitoring cable is installed so as to enclose a farm which is a target subjected to measurement of humidity which is the environmental variable. In the drawing, a first humidity measurement optical cable 8a (hereinafter, may be simply referred to as humidity measurement optical cable 8a) is installed on the upper side and the right side of the measurement target farm, and a second humidity measurement optical cable 8b (hereinafter, may be simply referred to as humidity measurement optical cable 8b) is installed from the lower side to the left side of the target farm. These humidity measurement optical cables 8a, 8b are respectively connected, at optical fiber connection points 11a, 11b, to optical communication cables 10a, 10b through which signals from the humidity measurement optical cables are inputted to an optical signal processing device 20. Here, the optical signal processing device 20 is a device that processes and calculates a frequency shift signal due to Brillouin scattering and a frequency shift signal due to Rayleigh scattering on the basis of signals detected by the humidity measurement optical cables 8a, 8b, and stores the proportionality constant and the change coefficient described above. In order to calculate the frequency shift amount for which the influence of temperature has been excluded from the humidity measurement signal, the optical signal processing device 20 is connected to two of an interrogator device I 21 and an interrogator device II 22, thus forming a monitoring humidity measurement system 30 that can perform measurement in two methods based on Brillouin scattering and Rayleigh scattering and can perform real-time signal measurement using the stored proportionality constant and change coefficient described above. The optical signal processing device 20 has a laser light source, and thus has a function of calculating and obtaining frequency shift due to Brillouin scattering and frequency shift due to Rayleigh scattering from backscatter light occurring in the optical fiber when a laser beam emitted from the laser light source enters into an optical fiber.

Here, in order to expand the range of the farm that can be managed, the installation area of the humidity measurement optical cable is limited to the minimum necessary range, and the above humidity measurement optical cable 8 is used for transferring measurement data. It is noted that the humidity measurement optical cable 8a is installed along the installation location of the optical communication cable 10a, and also installed along the installation location of an optical communication cable 10c branching from the optical communication cable 10a at a certain part (these optical communication cables are collectively referred to as optical communication cable 10). The interrogator devices 21, 22 are provided with spectroscopes having high wavelength resolution of sub-nanometer or smaller (spectroscopes serve as a core engine for signal analysis), and thus enable real-time optical fiber sensing with high wavelength resolution at high speed.

Using the above measurement system, the calculated frequency shift amounts are subjected to the calculation process through the steps shown above in FIG. 10, whereby the value of humidity corresponding to the installation location of the humidity measurement optical cable on the target farm can be calculated.

The operation procedure on the actual site in the case of using the above measurement system will be described in more detail with reference to FIG. 12. First, in step S11, the range or region that is a monitoring target is determined and the arrangement routes of the humidity measurement optical cable and the communication cable are considered. After these are determined, next, in step S12, the details of the configuration of the humidity measurement optical cable to be used for monitoring are determined. Next, in step S13, installation work for the humidity measurement optical cable is performed. At this time, a signal obtained by the humidity measurement optical cable is connected to a signal processing device via an optical communication cable. Next, in step S14, an initial value described above in step S1 is measured using Brillouin scattering, and the measured signal is stored. In addition, the map of the installation location of the humidity measurement optical cable is stored. Next, in step S15, the temperature, strain, and the like at a predetermined time are measured. Next, in step S16, data obtained in step S14 and step S15 are compared with each other and analyzed. Next, in step S17, on the basis of a comparison result D obtained through the analysis in step S16, whether or not the comparison result D satisfies the relationship shown in the flowchart is determined. If the relationship is satisfied, next, distribution data of a predetermined environmental variable is calculated and thus the operation procedure on the site is finished. If the relationship is not satisfied, schedules of measurement intervals and the like are determined in step S18, and thereafter, the process returns to step S15. Then, the processing in step S15 is performed again and the processing in the subsequent step S16 is performed again. Then, in operation of repeating the determination in step S17, the processing is repeated until the relationship of the repeatedly calculated values of D (a value obtained by dividing the absolute value of the difference between the (n+1)th value of D and the nth value of D by the nth value of D) becomes smaller than a predetermined value (e.g., smaller than 0.001).

Here, from the values of humidity at measurement points corresponding to the installation positions of the humidity measurement optical cables 8a, 8b, the value of humidity at the intersection (internally dividing point) of lines connecting these points may be calculated, and this value may be used as an approximately calculated value of humidity for the entire farm. That is, by providing the humidity measurement optical cables so as to enclose the target farm, it is possible to calculate the humidity distribution in the entire target farm. In addition, by using the system having optical fibers as described above, it is possible to monitor a target environmental variable in a distributed manner on a land over a range of several tens of km, even in the case where there is no equipment such as a power supply other than optical cables.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS 1 optical fiber
2 coating layer
3 humidity detection layer
4 protection layer
5 humidity measurement optical fiber
6 strand protection layer
7 reference optical fiber
8 humidity measurement optical cable
8a first humidity measurement optical cable
8b second humidity measurement optical cable
9 central part structure
10, 10a, 10b optical communication cable
11a, 11b optical fiber connection point
20 optical signal processing device
21 interrogator device I
22 interrogator device II
30 monitoring humidity measurement system
100 optical fiber wire
200 water-absorbing polymer material

What is claimed is:

1. A monitoring humidity measurement system comprising:
  a humidity measurement optical fiber including a first optical fiber and a humidity detection layer provided so as to cover the first optical fiber;
  a reference optical fiber for measuring an environmental variable other than humidity, the reference optical fiber including a second optical fiber and arranged along with the humidity measurement optical fiber; and
  an optical signal processing device having a laser light source and a plurality of signal channels individually connected to the humidity measurement optical fiber and the reference optical fiber, the optical signal processing device being configured to calculate and obtain Brillouin frequency shift and Rayleigh frequency shift from backscatter light of a laser beam entering from the laser light source into each optical fiber, and store a proportionality constant representing a relationship between the Brillouin frequency shift and humidity, and a change coefficient which is a change amount of the Rayleigh frequency shift per unit humidity change amount, wherein
  humidity at a predetermined position of the humidity measurement optical fiber is calculated from a sum of
    an initial humidity value obtained by multiplying, by the proportionality constant, a difference between initial Brillouin frequency shifts respectively calculated with the laser beam entering from the laser light source into the humidity measurement optical fiber and the reference optical fiber, and
    a humidity change value obtained by multiplying, by a reciprocal of the change coefficient, a value obtained by subtracting a difference between the Rayleigh frequency shifts calculated with the laser beam emitted from the laser light source and entering into the humidity measurement optical fiber and the reference optical fiber at an initial time, from a difference between the Rayleigh frequency shifts calculated with the laser beam emitted from the laser light source and entering into the humidity measurement optical fiber and the reference optical fiber after a predetermined period has elapsed since the initial time.

2. The monitoring humidity measurement system according to claim 1, wherein
  the reference optical fiber is a temperature measurement optical fiber for detecting temperature.

3. The monitoring humidity measurement system according to claim 1, wherein
  the humidity detection layer is formed by thin-film coating of a suitable PVA material which is a water-absorbing polymer material.

4. The monitoring humidity measurement system according to claim 1, further comprising a central part structure in which a plurality of tubes or solid wires formed in a strand shape are provided at a central axis part, wherein
  each of the humidity measurement optical fiber and the reference optical fiber is covered, around an outer circumference thereof, with a strand protection layer formed in an annular shape by a plurality of strands made of iron or stainless steel, and is an element composing an annular body covering the central part structure.

5. A monitoring humidity measurement system comprising:
- a humidity measurement optical fiber including an optical fiber for measuring both of temperature and humidity, and a humidity detection layer for detecting humidity, the humidity detection layer being provided in an annular shape intermittently in an axial direction of the optical fiber; and
- an optical signal processing device having a laser light source and a signal channel connected to the humidity measurement optical fiber, the optical signal processing device being configured to calculate and obtain Brillouin frequency shift and Rayleigh frequency shift from backscatter light of a laser beam emitted from the laser light source and entering into the optical fiber, and store a proportionality constant representing a relationship between the Brillouin frequency shift and humidity, and a change coefficient which is a change amount of the Rayleigh frequency shift per unit humidity change amount, wherein humidity at a predetermined position of the humidity measurement optical fiber is calculated from a sum of
- an initial humidity value obtained by multiplying, by the proportionality constant, a difference between initial Brillouin frequency shift at an axial-direction position of the optical fiber where the humidity detection layer is provided, and initial Brillouin frequency shift at an axial-direction position of the optical fiber where the humidity detection layer is not provided, which are calculated with the laser beam emitted from the laser light source and entering into the humidity measurement optical fiber, and
- a humidity change value obtained by multiplying, by a reciprocal of the change coefficient, a value obtained by subtracting a difference between Rayleigh frequency shift at the axial-direction position of the optical fiber where the humidity detection layer is provided and Rayleigh frequency shift at the axial-direction position of the optical fiber where the humidity detection layer is not provided, which are calculated with the laser beam emitted from the laser light source and entering into the humidity measurement optical fiber at an initial time, from a difference between Rayleigh frequency shift at the axial-direction position of the optical fiber where the humidity detection layer is provided, and Rayleigh frequency shift at the axial-direction position of the optical fiber where the humidity detection layer is not provided, which are calculated with the laser beam emitted from the laser light source and entering into the humidity measurement optical fiber after a predetermined period has elapsed since the initial time.

6. The monitoring humidity measurement system according to claim 5, wherein
the humidity detection layer is formed by thin-film coating of a PVA NH-18 material which is a water-absorbing polymer material.

7. A monitoring humidity measurement method using a monitoring humidity measurement system including:
- a humidity measurement optical fiber including a first optical fiber and a humidity detection layer provided so as to cover the first optical fiber;
- a reference optical fiber for measuring an environmental variable other than humidity, the reference optical fiber including a second optical fiber and arranged along with the humidity measurement optical fiber; and
- an optical signal processing device having a laser light source and a plurality of signal channels individually connected to the humidity measurement optical fiber and the reference optical fiber, the optical signal processing device being configured to calculate and obtain Brillouin frequency shift and Rayleigh frequency shift from backscatter light of a laser beam entering from the laser light source into each optical fiber, and store a proportionality constant representing a relationship between the Brillouin frequency shift and humidity, and a change coefficient which is a change amount of the Rayleigh frequency shift per unit humidity change amount, the monitoring humidity measurement method comprising
on the basis of an initial humidity value and a humidity change value, calculating a value of humidity at a present time as a sum of the initial humidity value and the humidity change value, wherein
the initial humidity value is calculated from the Brillouin frequency shift and the proportionality constant, and
the humidity change value is obtained from the change coefficient and a Rayleigh frequency shift change amount calculated from a difference between target data which is data of the Rayleigh frequency shift measured at target humidity and reference data which is data of the Rayleigh frequency shift measured at reference humidity.

8. A monitoring humidity measurement method using a monitoring humidity measurement system including:
- a humidity measurement optical fiber including an optical fiber for measuring both of temperature and humidity, and a humidity detection layer for detecting humidity, the humidity detection layer being provided in an annular shape intermittently in an axial direction of the optical fiber; and
- an optical signal processing device having a laser light source and a signal channel connected to the humidity measurement optical fiber, the optical signal processing device being configured to calculate and obtain Brillouin frequency shift and Rayleigh frequency shift from backscatter light of a laser beam emitted from the laser light source and entering into the optical fiber, and store a proportionality constant representing a relationship between the Brillouin frequency shift and humidity, and a change coefficient which is a change amount of the Rayleigh frequency shift per unit humidity change amount, the monitoring humidity measurement method comprising
on the basis of an initial humidity value and a humidity change value, calculating a value of humidity at a present time as a sum of the initial humidity value and the humidity change value, wherein
the initial humidity value is calculated from the Brillouin frequency shift and the proportionality constant, and
the humidity change value is obtained from the change coefficient and a Rayleigh frequency shift change amount calculated from a difference between target data which is data of the Rayleigh frequency shift measured at target humidity and reference data which is data of the Rayleigh frequency shift measured at reference humidity.

* * * * *